Figure 1:
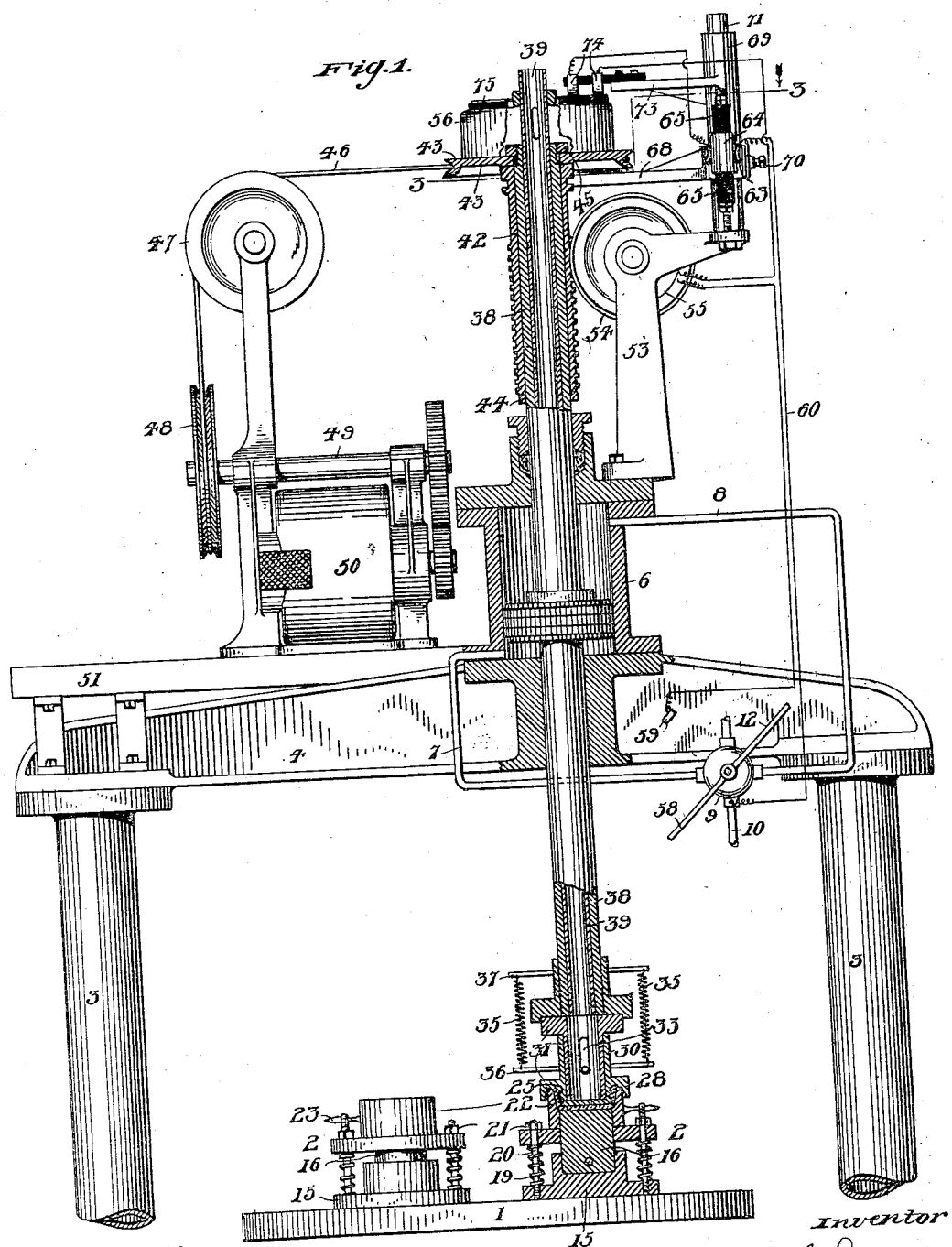

No. 859,306.

PATENTED JULY 9, 1907.

J. S. LUCOCK.
GLASS MOLDING MACHINE.
APPLICATION FILED AUG. 6, 1906.

4 SHEETS—SHEET 2.

No. 859,306. PATENTED JULY 9, 1907.
J. S. LUCOCK.
GLASS MOLDING MACHINE.
APPLICATION FILED AUG. 6, 1906.

4 SHEETS—SHEET 3.

Witnesses:
J. C. Heffleman
J. R. Keller

Inventor
John S. Lucock
By Kay, Totten & Winter
His Attys

No. 859,306. PATENTED JULY 9, 1907.
J. S. LUCOCK.
GLASS MOLDING MACHINE.
APPLICATION FILED AUG. 6, 1906.

4 SHEETS—SHEET 4.

witnesses: inventor
John S. Lucock

UNITED STATES PATENT OFFICE.

JOHN S. LUCOCK, OF WASHINGTON, PENNSYLVANIA.

GLASS-MOLDING MACHINE.

No. 859,306.  Specification of Letters Patent.  Patented July 9, 1907.

Application filed August 6, 1906. Serial No. 329,353.

*To all whom it may concern:*

Be it known that I, JOHN S. LUCOCK, a resident of Washington, in the county of Washington and State of Pennsylvania, have invented a new and useful Improvement in Glass-Molding Machines; and I do hereby declare the following to be a full, clear, and exact description thereof.

This invention relates to a machine for molding plastic materials in the form of a cup or the like having internal threads, and more especially to a machine for molding glass caps for fruit jars and the like.

The object of the invention is to provide machines of this character with mechanism for automatically withdrawing the threaded plunger immediately after the pressing operation is completed, in order to prevent the close adherence of the molded article to the plunger, due to the contraction of the former and expansion of the latter.

Glass caps for fruit jars and the like are provided with internal threads and are comparatively thin so that they cool very rapidly after pressing. In cooling the cap naturally shrinks while the threaded plunger used in forming the internal threads becomes heated and expands so that the cap adheres very tightly to the plunger making it difficult to remove it from the plunger.

All forms of apparatus heretofore devised for making internally threaded articles such as insulators, have been provided with a series of molds and the arrangement has been such that the pressing was done in one position or station, and the plunger removed at the next succeeding position or station. As a consequence there is a considerable interval of time between the pressing and the removal of the threaded plunger from the article. With insulators which have a comparatively large body of glass this is not detrimental as said large body cools slowly and the interval of time is useful in giving the same time to set. This arrangement, however, is very objectionable when forming glass articles having a thin body of metal, such as fruit jar caps and the like, for the reason that this thin body cools very rapidly, shrinking down on the threaded plunger and adhering thereto with such firm grip as to be difficult of removal and resulting in a large percentage of breakage. My improved mechanism is designed to overcome this and provides automatic mechanism wherein the threaded plunger is withdrawn immediately after the pressing operation, and at the same station on a rotary machine at which the pressing takes place.

To the accomplishment of the aforesaid object the invention consists of the arrangement of mechanism hereinafter described and claimed.

Figure 2:
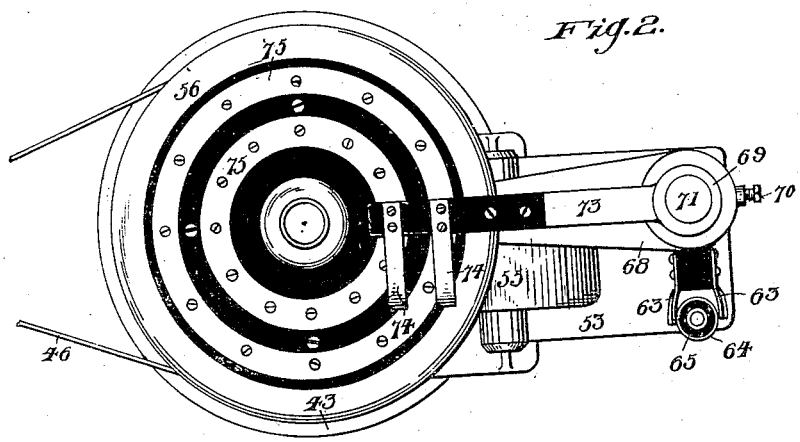
Figure 3:
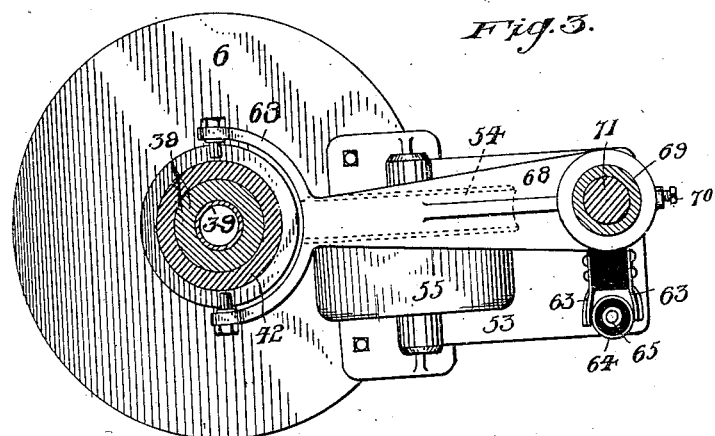
Figure 4:
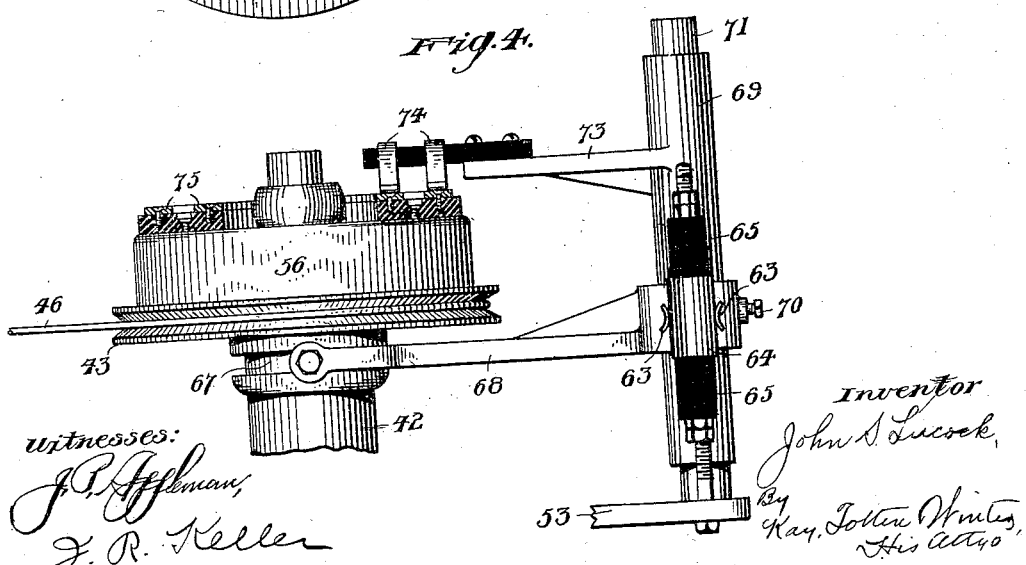
Figure 5:
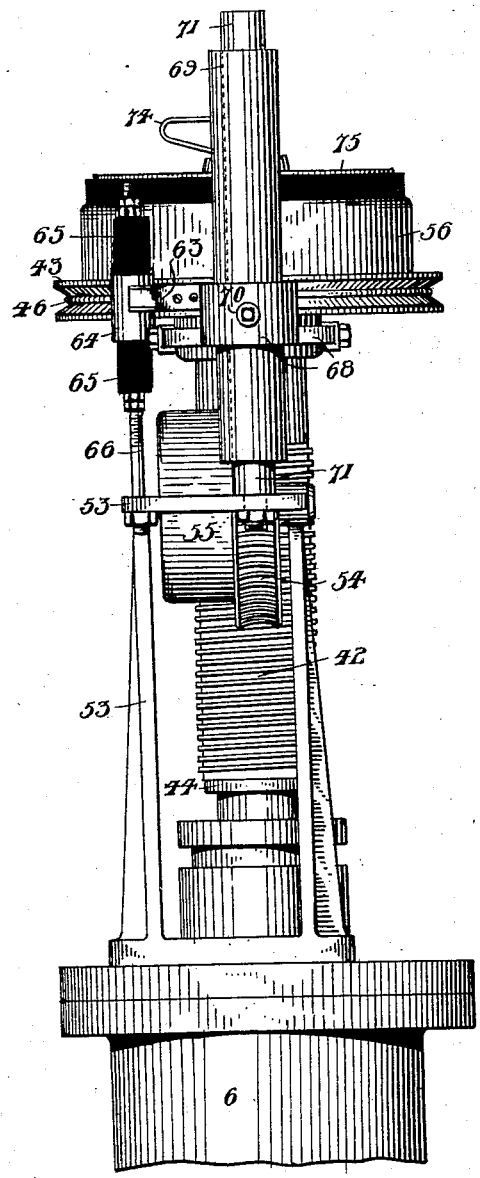
Figure 6:
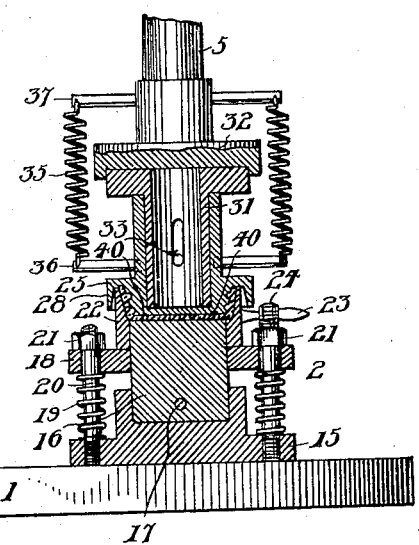
Figure 7:
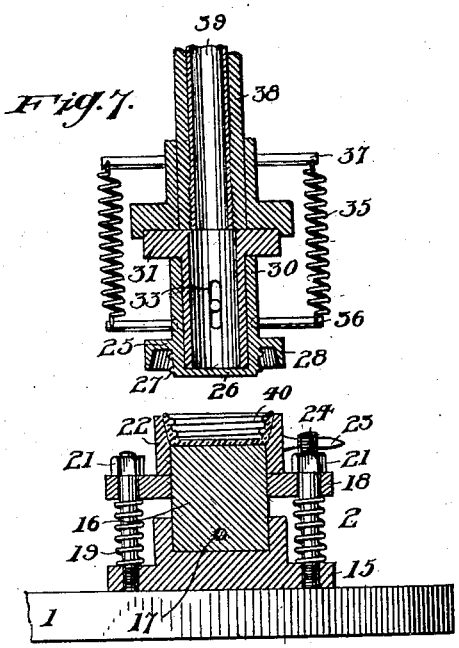
Figure 8:
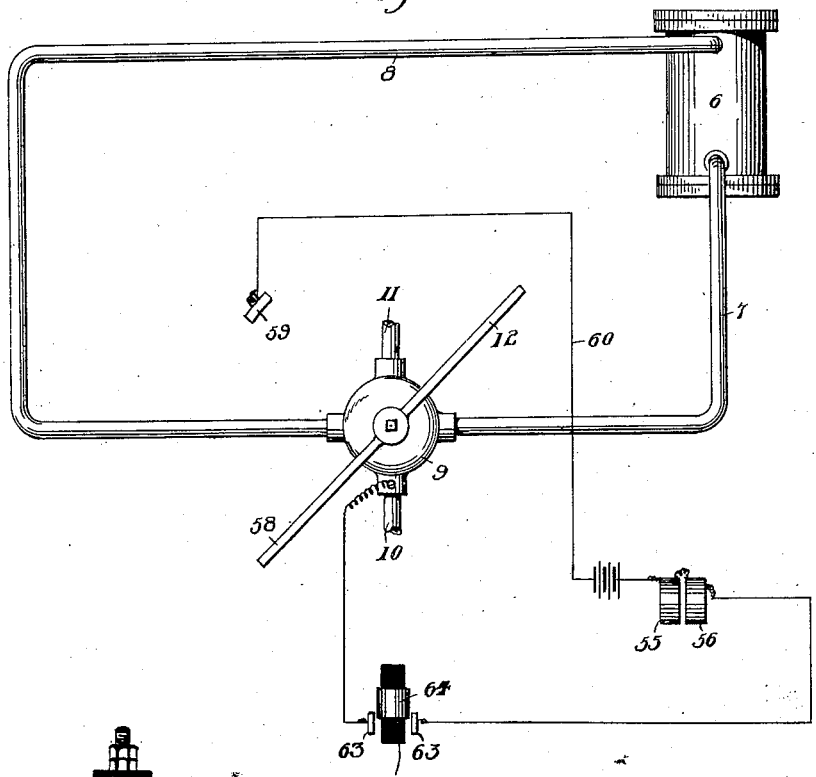
Figure 9:
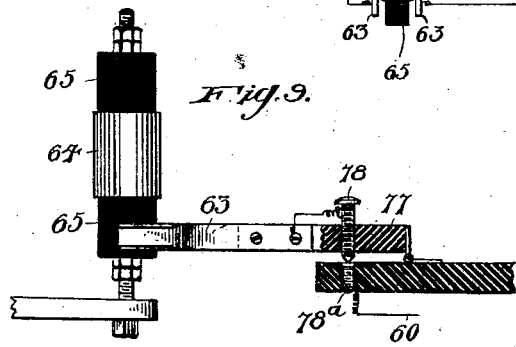
Figure 10:
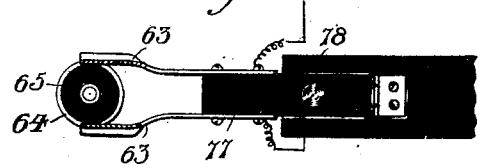

In the accompanying drawings, Figure 1 is in part an elevation and in part a vertical section of a well known type of glass molding machine showing my invention applied thereto; Fig. 2 is a plan view of the upper portion thereof; Fig. 3 is a horizontal section on the line 3—3, Fig. 1; Fig. 4 is a sectional view of the upper portion of the machine; Fig. 5 is a side elevation at right angles to Fig. 4; Figs. 6 and 7 are sectional views of the die and plunger showing the same in two positions; Fig. 8 is a diagram of the electric circuits; and Figs. 9 and 10 are detail views of a modification.

In the drawings the invention is shown as applied to a glass molding machine such as illustrated in United States patent to McClelland Myers, No. 809,969, January 16, 1906, and said invention will be described in connection with such machine. This specific machine has been selected merely for purposes of illustration and I wish it understood that no limitations are to be imposed upon the terms of the claims hereinafter made by either the specific illustration or specific description of apparatus, it being obvious that my invention can be applied to various types of machines and also that the particular instrumentalities whereby the several functions of my invention are obtained may be varied within wide limits.

Inasmuch as glass molding machines of the general type shown are quite widely used and are well understood, it has not been thought necessary to illustrate the entire machine, but only the necessary parts thereof with which my improvements co-operate. Accordingly no mechanism for rotating the mold table or indexing the same has been shown, neither is the base of the machine fully illustrated. These old parts may be of any desired form.

In the drawings 1 indicates a portion of a rotary table carrying a series of molds 2. The particular machine shown carries five molds (only two being shown) but the number may obviously be increased or decreased, and in fact my invention may apply to apparatus having only a single stationary mold. The table is mounted in a suitable frame, the drawings showing merely the uprights 3 and the overhead beam 4 of such frame. As just stated, the table can be rotated and indexed by any suitable means, or in any suitable way.

Co-operating with the molds 2 is a pressing plunger 5, only one such plunger being used for the series of molds, the latter being brought in succession underneath the plunger. This plunger may be actuated by any suitable reversing mechanism, that shown comprising a double acting cylinder 6 having a pipe 7 leading to its lower end and a similar pipe 8 leading to its upper end, said pipes leading to a suitable reversing controller, shown as a 4-way valve 9, to which the pipes 7 and 8, as well as a supply pipe 10, are connected, said valve also having an exhaust pipe 11. By means of this valve mechanism a pressure medium, such as compressed air, can be alternately admitted to and exhausted from the two ends of the cylinder 6, producing up and down reciprocations of the plunger 5. Inasmuch as 4-way valves are well known and especially as various forms of valve mechanism can be used for accomplishing this function, it has not been deemed necessary to illustrate or describe said valve mechanism in detail. This valve may be operated by any suitable means such as the handle 12.

The parts of the machine so far described are not new and obviously can be varied within wide limits.

The mold shown in the drawings is of special construction comprising a suitable base piece 15 provided with a cup or recess in which the mold bottom member 16 is fixed by means of a set screw 17. Surrounding the member 16 is a plate 18 which is normally held elevated by means of springs 19 surrounding bolts 20 which pass up through openings in the plate and whose heads 21 limit the upward movement of said plate. Upon this plate rests the collar member 22 of the mold the same being provided with upwardly projecting walls of the proper contour to give the desired configuration to the article to be molded. This collar is provided with a handle 23 whereby it may be taken off and replaced. A suitable stop is provided to prevent this collar from rotating, such stop being shown as an upwardly extended portion 24 of one of the bolts 20.

Co-operating with the mold is the presser 25, this having the central projecting portion 26 provided with the threads 27 for forming the internal threads in the article being molded, and may also have the circumferential flange portion 28 projecting over the edges of the mold 22. This flange portion may be a separate ring if desired. This presser is carried by the plunger 5 and the latter is mounted both for reciprocation and rotation, as hereinafter more fully described.

The presser may, if desired, be rigidly secured to or formed integral with the plunger 5. Preferably, however, it is so mounted as to have a sliding but non-rotating movement thereon. This is accomplished by providing said presser with a sleeve 30 surrounding either the lower end of the plunger 5, or, as shown, surrounding a tubular member 31 which is secured to a collar 32 on the lower end of the plunger 5. The presser 30 is connected to the tubular member 31 by a pin and slot connection, shown at 33, so that the presser can slide up and down but not rotate on the plunger 5. Suitable counter-balancing means are preferably provided for the presser, that shown comprising a number of light spiral springs 35, connecting pins 36 and 37 secured respectively to the presser and to the collar 32. These springs are only sufficiently strong to barely sustain the weight of the presser and their object is merely to counter-balance the latter and permit it to move slightly in order to prevent stripping or distorting the threads in the cap being formed as otherwise might occur in case the apparatus was not working properly. The plunger 5 is shown as formed of an outer tube 38 connected to the piston in the cylinder 6 and an inner rod or tube 39 rotatable in the tube 38, the latter in effect forming a long bearing for said rod.

In the use of the apparatus the presser is forced down into the glass in the mold 2 pressing the article 40 to the shape shown in cross section in Figs. 1, 6 and 7. In order to remove the presser, obviously it must be rotated and this is accomplished upon the upward movement of the pressing plunger by mechanism now to be described.

Surrounding the upper end of the plunger 5 is an externally threaded sleeve 42 being in effect a screw and having formed integral therewith or secured thereto a pulley or sheave 43. This pulley and sheave are held on the plunger between the lower collar 44 and the upper nut 45 so that they move up and down with the plunger but are free to rotate thereon. Passing around the pulley 43 is an endless belt 46 which passes over suitable guide sheaves 47 and also over a driven pulley 48, the latter being shown secured to shaft 49 of a motor 50 mounted on a plate 51 on the top of the machine frame. Obviously any other source of power and any other form of transmitting gearing may be used in place of those shown.

The screw 42 co-operates with a suitable nut, that shown being formed as a worm wheel 54 journaled in a suitable bracket or support 53 and meshing with the threads on the sleeve 42. This worm wheel is free to rotate during the downward movement of the plunger 5 and threaded sleeve 42, thus not affecting the movement of these parts, but on the reverse or lifting movement of the plunger 5 the worm wheel 54 is locked against rotation thus forming a stationary nut for the screw 42. This locking may be secured by various means, such as ratchet teeth formed or secured to the worm wheel and co-operating pawl, but is shown in the drawing in the form of a magnetic clutch 55 which is energized at the proper time by means hereinafter described.

Ordinarily the pulley 43 and threaded sleeve 42 rotate idly, being constantly driven by the means shown. These rotating members are adapted to be connected to the rotary spindle 39 of the plunger by suitable clutch mechanism, that shown comprising a magnetic clutch 56 secured to the central spindle 39 with its poles in position to utilize the pulley 43 as an armature. This magnetic clutch is also energized at the proper time by the means now to be described.

Connected to the controlling valve operating handle or other part is a switch arm 58 adapted, when said valve is moved to position to connect the source of supply to the lower end of the lifting cylinder 6 to come over a contact 59 in an electric circuit 60 in which circuit the clutches 55 and 56 are connected. The closing of this circuit energizes these magnetic clutches causing the clutch 55 to lock the worm wheel 54 and causing the clutch 56 to adhere to the sheave 43 so that the rotation of said sheave is communicated to the spindle 39 and through the latter to the presser 25, the mechanism being so arranged that this rotation is in a direction to withdraw the threaded presser from the molded article. During this rotation of the plunger the threaded sleeve 42 and stationary nut or worm wheel 54 regulate the rapidity of upward movement of the plunger 5, controlling this so that the upward movement caused by the cylinder 6 is in proportion to the speed of rotation and pitch of threads on the presser 25. Consequently the threads on the sleeve 42 are of the same pitch as those on the presser.

In the operation of pressing, the mold ring 22 moves downwardly due to the yielding of the springs 19.

This yielding movement is provided in order to compensate for variations in quantity of glass cut into the mold, this variation appearing in the thickness of the top of the molded cap. Consequently when the presser begins to rise the mold ring 22 is also forced up by the springs 19. It is inadvisable to begin the rotation of the presser until the upward movement of the mold has ceased. Consequently if the electric circuit were closed at the moment of admitting fluid pressure to the lower end of the power cylinder 6 the presser would begin to rotate while the mold had a tendency to rise and this might distort the still somewhat plastic threads on the inner face of the molded article. To avoid this I provide supplemental circuit closing means controlled from the presser lifting means so that the circuit 60 is not actually closed until the mold has reached the uppermost limit of its movement. This supplemental circuit closing mechanism is in the form of spring contacts 63 in the circuit 60 and a co-operating circuit closing member 64. In the specific form of mechanism shown the circuit closing member 64 is in the form of a conducting ring surrounding an insulating body 65 which is vertically adjustable by threads and nuts, as shown on the rod 66 secured to the supporting member 53 of the worm wheel 54. The adjustment of this circuit closer is provided in order that the circuit may be closed at the exact instant of the cessation of the upward movement of the die. The spring contacts 63 are vertically movable with the plunger 5 and are shown as mounted on an arm 68 having a forked end engaging an annular groove 67 in the sleeve 42, and having its opposite end provided with an opening surrounding a sleeve 69 and secured to the latter by a set-screw 70. The sleeve 69 is guided vertically on a standard 71 secured to the support 53 and at its upper end carries an arm 73 which in turn carries spring brushes 74 contacting with conducting rings 75 on the clutch member 56. Consequently when the plunger 5 rises the arm 68 and spring contacts 63 are carried with the same. This upward movement continues until the spring contacts are bridged by the stationary conducting ring 64 and it is not until this instant that the circuit is closed and the clutches 55 and 56 energize. The conducting ring 64 is of sufficient width to maintain the current for a period of time sufficient to allow the presser to be entirely disengaged from the molded article. After that the plunger may rise still further but without necessarily rotating the presser.

It is desirable that the plunger or presser be not rotating when it enters the glass in the mold. Hence it is desirable to keep the circuit 60 open on the downward movement of the plunger. This may be accomplished by the means shown in Figs. 9 and 10, in which the spring contacts 63 are carried by an insulating block 77, hinged to the arm 68 as shown, said block and arm having separable contacts 78 and 78ª in the circuit 60. It is obvious that on the upward movement of the contact springs 63 the contacts 78, 78ª will be held closed while on the downward movement the friction of said springs 63 on the ring 64 will cause the circuit to be broken at the contacts 78, 78ª, thus preventing rotation of the presser on its downward movement.

In the operation of the mechanism described the glass is cut into the molds and said molds brought in succession underneath the plunger. The various movements above described are effected entirely automatically from the controlling valve 9. When said valve is moved to lower the presser the electric circuit described is not closed and consequently this movement of the presser is the ordinary one merely pressing the molten glass down into the mold to the desired shape and in so doing carrying the mold slightly downwardly against the resistance of its supporting springs. As soon as the valve is moved to reverse position so as to raise the plunger 5 the switch 58 closes the circuit at contact 59. At this time, however, the circuit is, or at least may be, still open at the contact 63. The plunger will begin to move up and this movement will continue until the spring contacts 63 are bridged by the stationary ring 64, the latter having previously been so adjusted that this takes place at the instant the mold has reached the limit of its upward movement. The circuit is thus finally closed from the rising plunger, and this energizes the clutches 55 and 56. Consequently the presser 28 is rotated with the pulley 43, and at the same time the worm wheel 54 becomes stationary, so that it acts as a nut for the screw sleeve 42 and as a consequence is a regulator which determines the speed of upward movement of the plunger, the action of the fluid pressure in cylinder 6 being governed thereby. These parts are so designed that the plunger moves upwardly while rotating at exactly the pitch of the threads formed on the presser. As a consequence the threads, which may still be somewhat plastic, are not distorted. This, however, is absolutely prevented by the sliding counter-balanced mounting of the presser on the plunger.

It will be observed that by the mechanism described the presser is automatically withdrawn from the mold immediately upon the beginning of its upward movement. At this time the glass has not materially cooled and the presser itself has not had time to become materially heated so that the contraction of the one and the expansion of the other are negligible, making the withdrawal of the presser easy. In prior machines of this character the pressing element itself, that is, the plunger, has necessarily been lifted immediately after the pressing operation, but the threaded element or mandrel has remained for withdrawal at a later stage of the operation. By my apparatus, however, the forming element or mandrel and the presser or plunger are united so that when the latter is lifted the former must necessarily be withdrawn. In the claims I have used the term presser to include not only the pressing element or plunger 5 but also to include the forming member or mandrel.

While in the apparatus shown the worm wheel 54 is locked by means of a magnetic clutch in the same circuit with the clutch 56 this is not necessary as in a sense it is largely independent of said circuit. It may be locked, as heretofore stated, by an ordinary ratchet and pawl arrangement which will permit the free rotation of said wheel when the plunger is moving downwardly, but will prevent its backward rotation when the plunger is being raised. So also the circuit 60 need not be controlled by the valve handle, but may be controlled by a circuit closer actuated directly from the reciprocating plunger.

This invention may be applied to any form of plastic molding apparatus whether for molding glass or other material. It is not limited to a presser actuated by a fluid medium but is equally applicable to any pressing arrangement having a controller for reversing the movements of the presser itself, which reversing presser obviously can be used for closing the electric circuit, or for putting in operation mechanical or fluid pressure means for actuating the several clutches. All such modifications are intended to be included in the scope of the claims.

What I claim is:

1. Molding apparatus comprising in combination, a mold, a co-operating threaded presser mounted for reciprocation and for rotation independently of the reciprocation, mechanism for reciprocating said presser, a reversing controller therefor, and presser rotating mechanism rendered active by said controller.

2. Molding apparatus comprising in combination, a mold, a co-operating threaded presser mounted for reciprocation and for rotation independently of the reciprocation, presser lifting mechanism, presser rotating mechanism, and a controller arranged to render said mechanisms active simultaneously.

3. Molding apparatus comprising in combination, a mold, a co-operating threaded presser mounted for reciprocation and for rotation independently of the reciprocation, presser reciprocating mechanism, reversing means for said reciprocating mechanism, and presser rotating mechanism automatically brought into operation from the presser reversing means.

4. Molding apparatus comprising in combination, a series of molds, a threaded presser common to said series of molds and mounted for reciprocation and for rotation independently of the reciprocation, presser reciprocating mechanism, reversing means for said reciprocating mechanism, and presser rotating mechanism rendered active from the reversing means.

5. Molding apparatus comprising in combination, a series of molds, a threaded presser common to said series of molds and mounted for reciprocation and for rotation independently of the reciprocation, presser reciprocating mechanism, a controller therefor, and pressing rotating mechanism rendered active by said controller.

6. Molding apparatus comprising in combination, a series of molds, a threaded presser common to said series of molds and mounted for reciprocation and for rotation independently of reciprocation, presser lifting mechanism, presser rotating mechanism, and a controller arranged to render said mechanism active simultaneously.

7. Molding apparatus comprising in combination, a mold, a threaded former co-operating therewith, reciprocating pressing mechanism on which said former is rotatably mounted, a reversing controller for said pressing mechanism, and mechanism controlled by said reversible controller and arranged to rotate the former on the pressing mechanism.

8. Molding apparatus comprising in combination, a mold, a co-operating threaded presser mounted for reciprocation and for rotation independently of the reciprocation, presser reciprocating mechanism, constantly acting presser rotating mechanism, and means for connecting said rotating mechanism to the presser in its upward movement.

9. Molding apparatus comprising in combination, a mold, a threaded former co-operating therewith, reciprocating pressing mechanism on which said former is rotatably mounted, and rotating mechanism for the former including a clutch and clutch actuating means operated automatically from the pressing mechanism in its lifting movement.

10. Molding apparatus comprising in combination, a mold, a co-operating threaded presser mounted for reciprocation and for rotation independently of the reciprocation, presser rotating mechanism including a clutch, and means operated simultaneously with the reciprocation of the presser for actuating said clutch.

11. Molding apparatus comprising in combination, a mold, a co-operating threaded presser mounted for reciprocation and for rotation independently of the reciprocation, reciprocating mechanism for said presser, a reversing controller for said reciprocating mechanism, and presser rotating mechanism including a clutch controlled by said reversing controller.

12. Molding apparatus comprising in combination, a mold, a co-operating threaded presser mounted for reciprocation and rotation, presser rotating mechanism including a clutch, an electric circuit for rendering said clutch active, and circuit controlling means operated on the lifting movement of the presser.

13. Molding apparatus comprising in combination, a mold, a co-operating threaded presser mounted for reciprocation and for rotation independently of the reciprocation, actuating mechanism for said presser including lifting means, and lifting regulating means brought into operation automatically on the lifting movement of the presser.

14. Molding apparatus comprising in combination, a mold, a co-operative threaded presser mounted for reciprocation and for rotation independently of the reciprocation, rotating mechanism for said presser active on its lifting movement, and automatic means for regulating the lifting movement to correspond to the rotation and pitch of thread on the presser.

15. Molding apparatus comprising in combination, a mold, a co-operating threaded presser mounted for reciprocation and for rotation independently of the reciprocation, rotating mechanism therefor active on the lifting movement thereof, and means rendered active by the reciprocation of the presser for regulating the rate of lifting movement to correspond to the rotation and pitch of the thread on the presser.

16. Molding apparatus comprising in combination, a mold, a co-operating threaded presser mounted for reciprocation and for rotation independently of the reciprocation, presser reciprocating mechanism, presser rotating mechanism, a reversing controller for said reciprocating mechanism, and means rendered active thereby to regulate the lifting movement of the presser to correspond to the rotation and pitch of thread on the presser.

17. Molding apparatus comprising in combination, a mold, a co-operating threaded presser mounted for reciprocation and for rotation independently of the reciprocation, presser lifting means, presser rotating mechanism, means for regulating the lifting movement of the presser, and an electric circuit for said regulating means closed on the lifting movement of the presser.

18. Molding apparatus comprising in combination, a mold, a co-operating threaded presser mounted for reciprocation and rotation, reciprocating mechanism therefor, rotating mechanism therefor, an electric circuit controlled by the reciprocation of the presser, and means actuated by said circuit for regulating the rate of lifting movement of the presser to correspond to its rotation and pitch of thread.

19. Molding apparatus comprising in combination, a mold, a co-operating threaded presser mounted for reciprocation and for rotation independently of the reciprocation, actuating mechanism for said presser including lifting means, and automatic means for rotating the presser and regulating its lifting movement to correspond to the rotation and pitch of the thread on the presser.

20. Molding apparatus comprising in combination, a mold, a co-operating threaded presser mounted for reciprocation and rotation, reciprocating mechanism therefor including lifting means, and regulating mechanism for the lifting movement comprising a rotatable screw, a rotatable nut, and automatic means for locking said nut on the lifting movement of the presser.

21. Molding apparatus comprising in combination, a mold, a co-operating threaded presser mounted for reciprocation and for rotation independently of the reciprocation, and regulating mechanism for the lifting movement of the presser comprising a screw, a nut, and mechanism for rotating said screw during the lifting movement.

22. Molding apparatus comprising in combination, a mold, a co-operating threaded presser mounted for reciprocation and rotation, and regulating means for the lifting movement of the presser comprising a screw, a rotatable nut, and means for rotating the screw and locking the nut during the lifting movement of the presser.

23. Molding apparatus comprising in combination, a mold, a co-operating threaded presser mounted for reciprocation and rotation, an electric circuit controlled by the reciprocation of said presser, regulating means for the lifting movement of the presser including a screw, means in the electric circuit for rotating the screw, and a co-operating nut.

24. Molding apparatus comprising in combination, a mold, a co-operating threaded presser mounted for reciprocation and rotation, regulating means for the lifting movement of the presser including a screw, a co-operating nut, an electric circuit screw rotating means i nsaid circuit, and an adjustable circuit closer actuated by the lifting of the presser.

25. Molding apparatus comprising in combination, a mold, a co-operating threaded presser, mounted for reciprocation and rotation, an actuator therefor on which said presser is movably mounted, and counter-balancing means for said presser.

26. Molding apparatus comprising in combination, a mold, a co-operating threaded former mounted for reciprocation and rotation, an actuator on which said former is slidably mounted, and a spring connecting said former and actuator.

In testimony whereof, I the said JOHN S. LUCOCK have hereunto set my hand.

JOHN S. LUCOCK.

Witnesses:
  F. W. WINTER,
  M. D. VOGEL.